(12) United States Patent
Paropkari et al.

(10) Patent No.: US 10,432,499 B2
(45) Date of Patent: Oct. 1, 2019

(54) APPLICATION PROGRAM INTERFACE ENDPOINT MONITORING

(71) Applicant: eBay Inc., San Jose, CA (US)

(72) Inventors: Anuya Paropkari, San Jose, CA (US); Shivam Bhatt, San Jose, CA (US); Hetang Shah, Milpitas, CA (US)

(73) Assignee: EBAY INC., San Jose, CA (US)

( * ) Notice: Subject to any disclaimer, the term of this patent is extended or adjusted under 35 U.S.C. 154(b) by 223 days.

(21) Appl. No.: 15/173,129

(22) Filed: Jun. 3, 2016

(65) Prior Publication Data

US 2017/0353375 A1 Dec. 7, 2017

(51) Int. Cl.
| | |
|---|---|
| *H04L 12/26* | (2006.01) |
| *H04L 12/24* | (2006.01) |
| *H04L 29/06* | (2006.01) |
| *H04L 29/08* | (2006.01) |
| *H04L 29/14* | (2006.01) |

(52) U.S. Cl.
CPC .......... *H04L 43/50* (2013.01); *H04L 41/0803* (2013.01); *H04L 63/08* (2013.01); *H04L 67/02* (2013.01); *H04L 69/40* (2013.01)

(58) Field of Classification Search
CPC ........ H04L 43/50; H04L 67/02; H04L 69/40; H04L 63/08; H04L 41/0803
See application file for complete search history.

(56) References Cited

U.S. PATENT DOCUMENTS

| | | | | |
|---|---|---|---|---|
| 2004/0243338 | A1* | 12/2004 | Sabiers | G06F 11/3495 702/122 |
| 2009/0006614 | A1* | 1/2009 | Le | H04L 67/025 709/224 |
| 2012/0047169 | A1* | 2/2012 | Schroeder | G06F 17/30578 707/770 |
| 2013/0174126 | A1* | 7/2013 | Belihomji | G06F 11/3668 717/127 |
| 2014/0300758 | A1* | 10/2014 | Tran | H04N 5/225 348/207.1 |
| 2017/0060730 | A1* | 3/2017 | Li | G06F 11/3616 |

* cited by examiner

Primary Examiner — Abdulkader M Alriyashi
(74) Attorney, Agent, or Firm — Maschoff Brennan (57) ABSTRACT

A computer-implemented method to monitor application program interface (API) endpoints may include sending, over a network from a computing system, a test structure to an API endpoint. In some embodiments, the test structure may be configured based on the API endpoint. The method may further include receiving a first response over the network at the computing system from the API endpoint in response to sending the test structure and resending, over the network from the computing system, the test structure to the API endpoint. The method may further include receiving a second response at the computing system from the API endpoint in response to resending the test structure and comparing, at the computing system, the first response and the second response. The method may further include determining, at the computing system, a status of the API endpoint based on the comparison of the first response and the second response.

20 Claims, 9 Drawing Sheets

APPLICATION PROGRAM INTERFACE ENDPOINT MONITORING

FIELD

The embodiments discussed herein are related to monitoring application program interface (API) endpoints.

BACKGROUND

An Application Program Interface (API) is a programming language format used by an application program to communicate with an operating system or other control programs such as a database management system (DBMS) or communications protocol. An API may include a library of components such as routines, protocols, and/or tools for building software application or obtaining information. The components may be software functions and processes such as executable code or scripts. In some circumstances, the APIs may be exposed over a network such as in a web page or desktop application that access APIs over the network.

APIs may allow developers to create application software which may communicate directly with a particular operating system or computer platform by integrating functions from the operation system's API library into the application software.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure discuss a computer-implemented method to monitor application program interface (API) endpoints. In some embodiments, multiple API endpoints may be continuously monitored to determine the health of the API endpoints. In these and other embodiments, the health of each of the API endpoints may be presented in a single user interface.

In some embodiments, the method may be implemented by a system. In these and other embodiments, for each API endpoint to be monitored, a test file may be obtained. A test file for an API endpoint may include a JavaScript object notation (JSON) structure that includes the data for transmitting in a call to the API endpoint. Each test file for the same API endpoint may allow the system to monitor the API endpoint from multiple different environments. Thus, one environment, such as a production environment, may use one test file for an API endpoint and a second environment, such as a staging environment, may use another test file for the same API endpoint. Thus, the system may check on the same API endpoint with respect to multiple different environments.

In some embodiments, the API endpoint may be a secured endpoint. In these and other embodiments, the JSON structure may further include tokens for validating the call to the API endpoint. Alternatively or additionally, the system may store user information and request a token for an API endpoint, receive the token, and use the received token for making the call to the API endpoint.

In some embodiments, after an API endpoint is called, the system may record the status of the API endpoint. The status of the API endpoint may be a success or error. In an error state, hypertext transfer protocol (HTTP) error codes may be received. In these and other embodiments, a work flow may be generated regarding correcting the HTTP error code for the API endpoint.

When the API endpoint call is a success, a response may be received from the API endpoint. The first time the API endpoint is called, the response may be stored. During subsequent calls to the API endpoint, the received responses may be compared to the stored response. If there is a difference between a received response and the stored response, then a status of the API endpoint may be determined to be error. In some embodiments, a user may review the received responses after a response has been stored. If a user approves of the received response, the subsequent results may be stored in place of the previously stored response.

The system and method described in this disclosure may provide various benefits. For example, the system and methods may increase a speed of monitoring, reporting, and fixing API endpoints. Some embodiments may include features that may improve the ability to diagnose API endpoint errors and to maintain a proper functionality of servers and other computer systems. Furthermore, the disclosure may also provide meaningful limitations in one or more particular technical environments that go beyond an abstract idea. For example, embodiments of the disclosure may provide improvements in the technical field of networks, servers, and particularly in a system that uses API endpoints.

Figure 1:
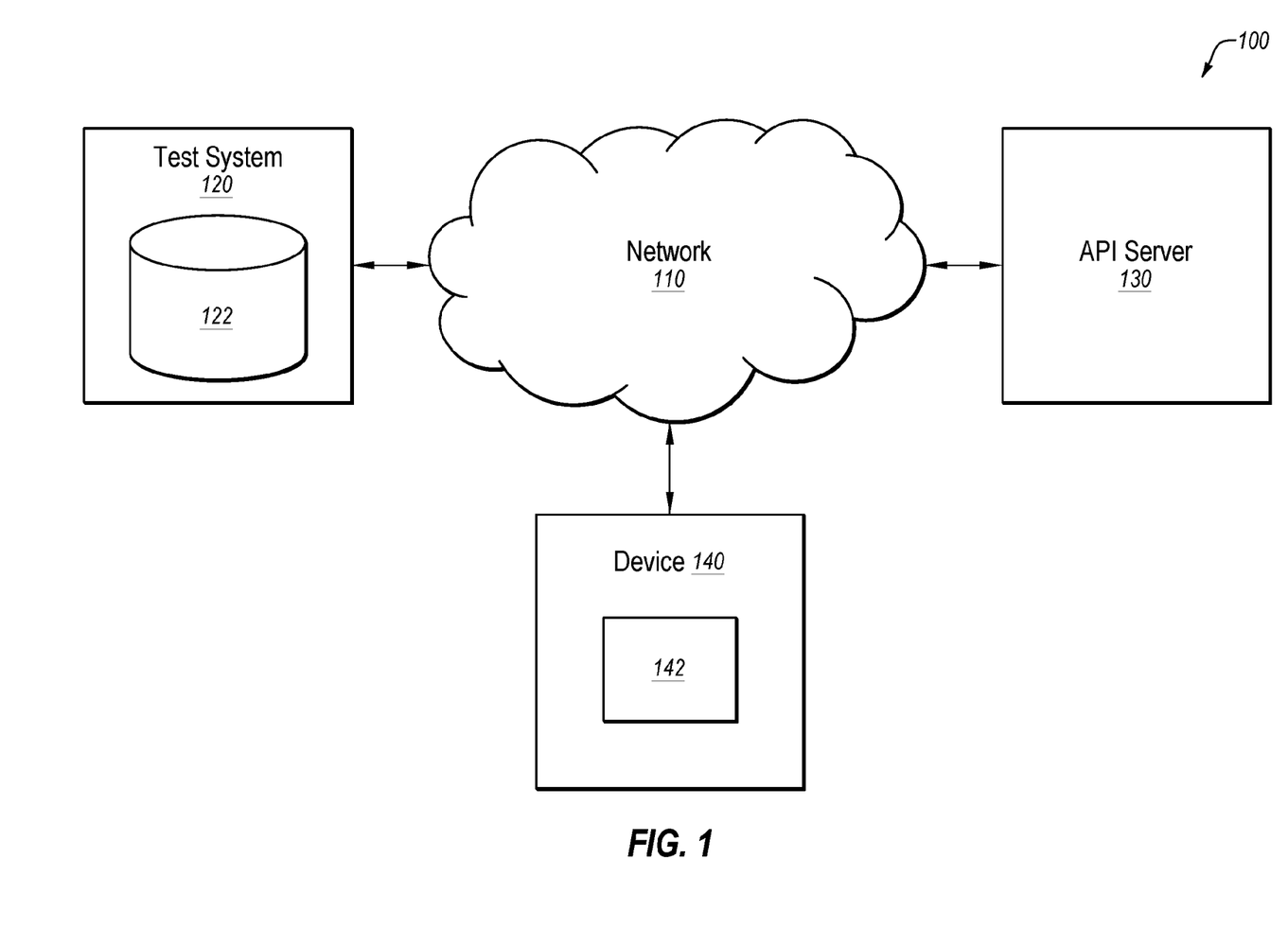
FIG. 1 illustrates an example system configured to monitor application program interface (API) endpoints.

Turning to the figures, FIG. 1 illustrates an example system 100 configured to monitor application program interface (API) endpoints. The system 100 may be arranged in accordance with at least one embodiment described in the present disclosure. The system 100 may include a network 110, a test system 120 that includes a database 122, an API server 130, and a device 140 with a display 142.

The network 110 may be configured to communicatively couple the test system 120 with the device 140 and the API server 130. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

In some embodiments, the test system 120 may include any configuration of hardware, such as processors, servers, and/or databases that are networked together and configured to perform a task. For example, the test system 120 may include multiple computing systems, such as multiple servers that each include memory and at least one processor, which are networked together and configured to perform operations as described in this disclosure, among other operations. In some embodiments, the test system 120 may include computer-readable-instructions that are configured to be executed by the test system 120 to perform operations described in this disclosure.

In some embodiments, the API server 130 may include any configuration of hardware, such as processors, servers, and/or databases that are networked together and configured to perform a task. For example, the API server 130 may include multiple computing systems, such as multiple servers that each include memory and at least one processor, which are networked together and configured to perform operations as described in this disclosure, among other operations. In some embodiments, the API server 130 may include computer-readable-instructions that are configured to be executed by the API server 130 to perform operations described in this disclosure. In some embodiments, the API server 130 may include one or more API endpoints. An API endpoint may include a unique universal resource location (URL) hosted by the API server 130 for an API.

The device 140 may be any electronic or digital device. For example, the device 140 may include a desktop computer, a laptop computer, a smartphone, a mobile phone, a tablet computer, or any other processing device. In some embodiments, the device 140 may be configured to receive and present information from the test system 120.

In general, the test system 120 may be configured to monitor the status, e.g., the health, of one or more API endpoints of the API server 130 over the network 110. The test system 120 may provide a user interface to the device 140 to present in the display 142 that provides information about the status of the API endpoints. In this manner, a user of the device 140 may be provided with information about the API endpoints without manually investigating each of the individual API endpoints.

In some embodiments, the test system 120 may be configured to monitor multiple different aspects of the API endpoints. For example, the test system 120 may be configured to determine HTTP response status codes for the API endpoints. Alternately or additionally, when the HTTP responses status is normal, the test system 120 may be configured to determine a status of operation of the API endpoints. For example, the test system 120 may be configured to determine if a response generated by the API server 130 for a given request is an expected response. Thus, the test system 120 may be configured to determine if the programmed functionality of the API server 130 in response to receiving a request is normal or is error. As a result, the test system 120 may be configured to determine if the API endpoints are operating normally with respect to responding to HTTP protocols and with respect to the programmed functionality of the API endpoints.

Figure 2:
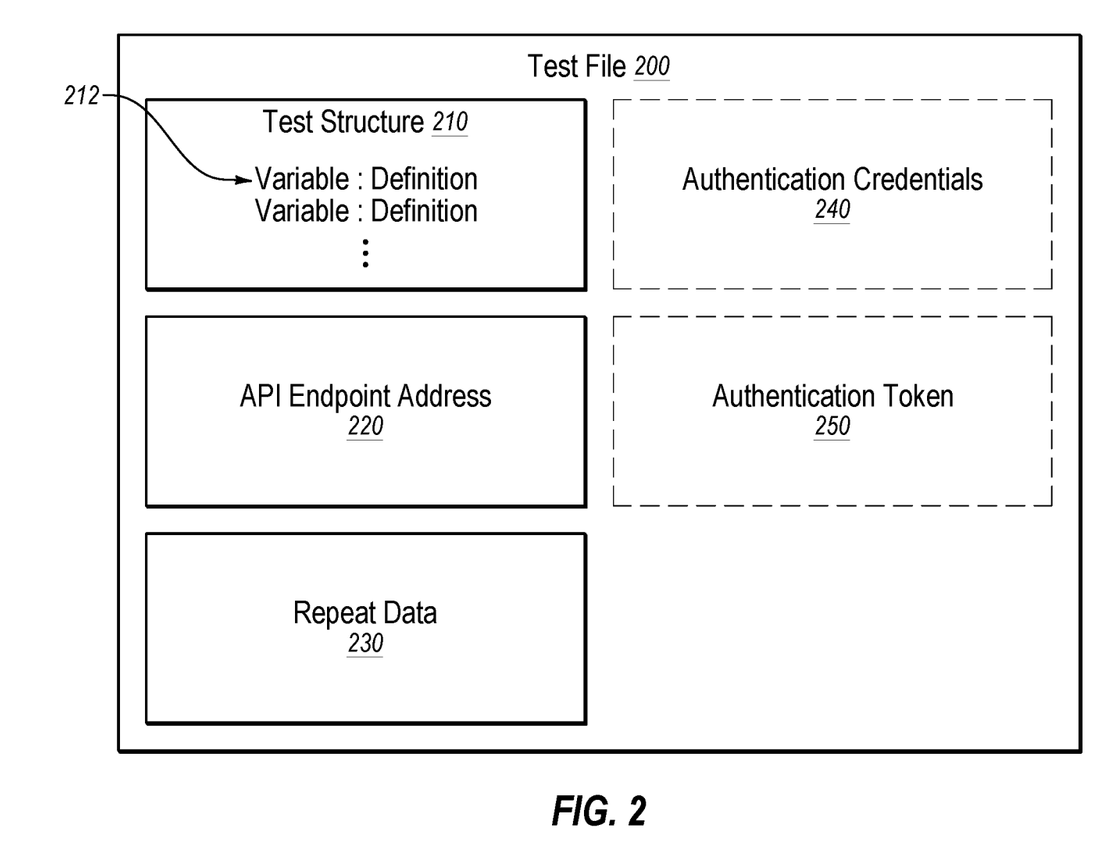
FIG. 2 illustrates an example test file that may be used in a system configured to monitor API endpoints.

To monitor an API endpoint, the test system 120 may be configured to receive a test file for monitoring the API endpoint. The test file may be stored in the database 122 after receipt. The test file may include data that may be used to monitor the status of the API endpoint. FIG. 2 illustrates an example test file 200 that may be used in a test system configured to monitor API endpoints, such as the test system 120. The test file 200 may be arranged in accordance with at least one embodiment described in the present disclosure.

Referring to FIGS. 1 and 2, in some embodiments, the test file 200 may be configured to provide data to allow the test system 120 to monitor an API endpoint of the API server 130. The test file 200 may include a test structure 210, an API endpoint address 220, and repeat data 230. In some embodiments, the test file 200 may include one or more of authentication credentials 240 and an authentication token 250.

In some embodiments, the test system 120 may receive the test file 200 from an outside system or the test system 120 may be configured to generate the entire test file 200 or part of the test file 200 based on information about the API endpoint or previous test files. For example, the device 140 may be configured to interact with the API server 130 and in particular with an API endpoint of the API server 130. In these and other embodiments, the test file 200 may be generated and provided to the test system 120 from the device 140. Alternately or additionally, the test system 120 may receive an indication of an API endpoint to monitor. In these and other embodiments, the test system 120 may be configured with a user interface. Based on information received through the user interface, the test system 120 may be configured to generate the test file 200.

The test structure 210 may be a file that includes information 212 that is provided to the API endpoint when a call is made to the API endpoint. The information 212 included in the test structure 210 may include one or more variables, parameters, among other coding objects. In some embodiments, the variables, parameters, and other coding objects may be selected based on the configuration of the API endpoint. For example, the API endpoint may include various coding objects that are expected in a request. In these and other embodiments, the test structure 210 may include the various coding objects. Furthermore, to test various aspects of the API endpoint, the coding objects may have different definitions or values. In some embodiments, the test structure 210 may have a particular structure or format based on the configuration of the API endpoint.

In some embodiments, the coding language of the test structure 210 may vary and may be selected based on the API endpoint being monitored. For example, the test structure 210 may be in JSON, Extensible markup language (XML), yet another mark-up language (YAML), among other languages or formats.

In some embodiments, the information 212 in the test structure 210 may determine the processes of the API server 130 monitored by the test system 120. For example, a single API endpoint may support different processes. In these and other embodiments, the test structure 210 provided in a call to the API endpoint may result in the API server 130 running different processes and the API endpoint returning different results. For example, when the test structure 210 includes first code objects with first definitions, a call to the API endpoint with the test structure 210 with the first code objects with the first definitions may invoke a first process at the API server 130 that results in first results. Alternately, when the test structure 210 includes the first code objects with second definitions, a call to the API endpoint with the test structure 210 with the first code objects with the second definitions may invoke a second process at the API server 130 that results in second results.

As another example, when the test structure 210 includes first code objects, a call to the API endpoint with the test structure 210 with the first code objects may invoke a first process at the API server 130 that results in first results. Alternately, when the test structure 210 includes second code objects, a call to the API endpoint with the test structure 210 with the second code objects may invoke a second process at the API server 130 that results in second results. Thus, the information 212 of the test structure 210 may be configured to monitor a particular process of the API server 130.

In some embodiments, the test file 200 may include multiple test structures 210 to test a particular process of the API server 130. For example, a process of the API server 130 may include making a first call to the API endpoint, receiving a first response, and based on the first response, making a second call to the API endpoint. In these and other embodiments, the test file 200 may include a different test structure 210 for each of the calls. Furthermore, the test structures 210 for subsequent calls may be modified by the test system 120 based on the received responses from the API endpoint.

The API endpoint address 220 may include a URL address of the API endpoint to be monitored. In these and other embodiments, the test structure 210 may be sent by the test system 120 to the API endpoint address 220. In some embodiments, the API endpoint address 220 may be part of the test structure 210.

In some embodiments, the API endpoint may be a secure API endpoint. In these and other embodiments, the API endpoint may be accessed after the request is authenticated by the API server 130. In these and other embodiments, the test system 120 may use the authentication credentials 240 and/or the authentication token 250.

When using the authentication credentials 240, the test system 120 may include additional test structures, such as an authentication test structure. In these and other embodiments, the test system 120 may provide an authentication test structure that includes the authentication credentials 240 that request access and tokens from the API server 130. In response to making a call using the authentication test structure with the appropriate authentication credentials 240, the API server 130 may return the authentication token 250. The test system 120 may then insert the authentication token 250 into the test structure 210 and send the test structure 210 to the API endpoint of the API server 130. The test structure 210 including the authentication token 250 may allow the API server 130 to authenticate the test structure 210 and provide a response. Without the authentication token 250, the API server 130 may deny the test structure 210 and no monitoring of the processes of the API server 130 may be possible.

The repeat data 230 may indicate to the test system 120 how often the test system 120 may makes calls to the API endpoint to monitor the health of the API endpoint. In some embodiments, the repeat data 230 may be indicate how frequently, the test system 120 may make calls to the API endpoint. For example, the repeat data 230 may indicate an interval between calls, specific time for calls, or some other interval based on an algorithm. Alternately or additionally, the repeat data 230 may indicate a condition for determining when to make additional calls to the API endpoint. For example, the condition may be associated with the monitoring of other API endpoints by the test system 120, a network condition, among other conditions.

To monitor the API endpoint, the test system 120 may begin by making a call to the API endpoint over the network 110 by sending the test structure 210 to the API endpoint address 220. The test system 120 may receive HTTP status information regarding the call to the API endpoint. For example, the HTTP status information may indicate that the API endpoint has an HTTP error. For example, the HTTP status information may be a status code. When the status code begins with the digit "4" or "5," the HTTP status information may indicate that the status of the API endpoint is error.

When the HTTP status of the API endpoint is not error, the test system 120 may receive a response from the API server 130 based on the information in the test structure 210. When the response is a first response received from the API server 130 in response to the test structure 210, the test system 120 may store the response in the database 122. When the response is not a first response from the API server 130 in response to the test structure 210, the test system 120 may compare the response to the response stored in the database 122. For example, after storing the first response, the test system 120 may resend the test structure 210 and receive second response. When the received second response is different than the stored first response from the database 122, the test system 120 may make a determination that the API server 130 is not responding correctly to API calls at the API endpoint. In these and other embodiments, when the API server 130 is not responding correctly, the test system 120 may set the status of the API endpoint to error.

When the status of the API endpoint is error, the test system 120 may note the status of the API endpoint is error. In some embodiments, the test system 120 may be configured to generate a workflow request in response to the status of the API endpoint being error. In these and other embodiments, the workflow request may indicate why the status of the API endpoint is error. For example, the workflow may include the HTTP error code received by the test system 120. As another example, the workflow may include portions or all of the received response that differ from a stored response.

In some embodiments, the test system 120 may be configured to provide an indication of the status of the API endpoint to the device 140. In some embodiments, the device 140 may present the status of the API endpoint on the display 142. In some embodiments, the present status of the API endpoint may include why the status of the API endpoint is error in a similar manner as the workflow discussed above.

In some embodiments, the device 140 may obtain an indication that a response that invoked an error status is a proper response. In these and other embodiments, the device 140 may present the response that invoked the error status to a user. The user may indicate that the response that the invoked the error status is ok. In these and other embodiments, the device 140 may direct the test system 120 to store the response that invoked the error status in the database 122. In these and other embodiments, future responses received from the API endpoint may be compared to the response that invoked the error status that was indicated as proper and stored in the database 122.

In some embodiments, the test file 200 may include an ideal response. In these and other embodiments, in place of saving a response from the API server 130 for comparison to future responses, the test system 120 may compare responses to the ideal response from the test file 200. In some embodiments, the test file 200 may indicate acceptable differences between a saved response and a recently received response. In these and other embodiments, an API endpoint may have a status of error when the differences between the saved response and the recently received response is not an acceptable difference.

In some embodiments, the test system 120 may assign other statuses to an API endpoint besides normal and error. For example, the test system 120 may assign a status of normal, HTTP error, HTTP warning, operational error, operational warning, among other statuses. In these and other embodiments, the test system 120 may determine the status based on logic in the test system 120 or indications of error classifications in the test file 200. For example, certain HTTP status codes may result in a status of HTTP error while other status codes may result in a status of HTTP warning. As another example, first differences between a stored response and a recently received response may result in an operational error, while second differences may result in an operational warning.

Modifications, additions, or omissions may be made to the test file 200 without departing from the scope of the present disclosure. For example, in some embodiments, the test file 200 may not include the API endpoint address 220, the repeat data 230, the authentication credentials 240, and/or the authentication token 250. Alternately or additionally, the test file 200 may include additional test structures 210.

Furthermore, modifications, additions, or omissions may be made to the system 100 without departing from the scope of the present disclosure. For example, in some embodiments, the system 100 may include one or more operation systems. The operation systems may be configured to communicate with the API endpoint of the API server 130 and the device 140. In these and other embodiments, the device 140 may be configured to receive a status of the API endpoint on behalf of the operation systems.

Figure 3:
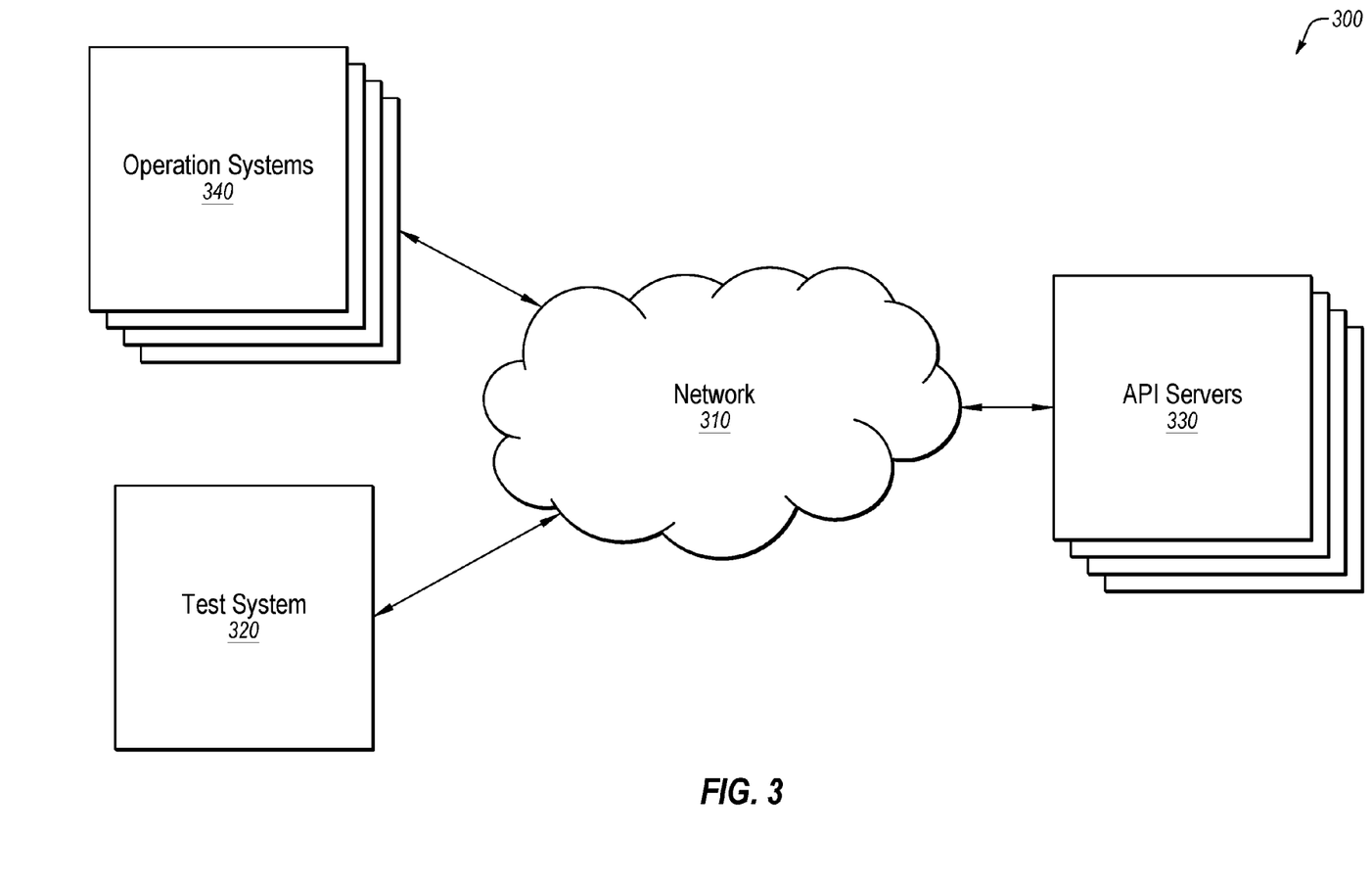
FIG. 3 illustrates another example system configured to monitor API endpoints.

For example, FIG. 3 illustrates another example system 300 configured to monitor API endpoints. The system 300 may be arranged in accordance with at least one embodiment described in the present disclosure. The system 300 may include a network 310, a test system 320, API servers 330, and operation systems 340. The network 310, the test system 320, and the API servers 330 may be analogous to the network 110, the test system 120, and the API server 130 of FIG. 1. Accordingly, no additional disclosure is provided for the network 310, the test system 320, and the API servers 330 with respect to FIG. 3.

In some embodiments, each of the operation systems 340 may include any configuration of hardware, such as processors, servers, and databases that are networked together and configured to perform a task. For example, the operation systems 340 may be different systems. In these and other embodiments, some of the operation systems 340 may be controlled by an entity that controls the test system 320 and others of the operation systems 340 may be controlled by other entities. For example, the test system 320 and the API servers 330 may be part of an online marketplace. Some of the operation systems 340 may be systems run by third parties that make calls to the API servers 330 and receive information therefrom regarding buying or selling products and services provided by the online marketplace. Others of the operation systems 340 may be internal systems of the online marketplace. In these and other embodiments, the others of the operation systems 340 that may be internal systems may be different operational environments of the same system. For example, one of the operation systems 340 may be a production environment, another of the operation systems 340 may be a staging environment, and another of the operation systems 340 may be a testing environment.

In some embodiments, the operation systems 340 may be configured to make calls to one or more of the API endpoints of the multiple API servers 330. In these and other embodiments, the test system 320 may be configured to monitor the status of at least one API endpoint for each of the multiple API servers 330 on behalf of the operation systems 340.

To monitor the status of the API endpoints for each of the API servers 330 on behalf of the operation systems 340, the test system 320 may receive test files from the operation systems 340. In some embodiments, two or more of the operation systems 340 may make calls to the same API endpoints. In these and other embodiments, the test system 320 may receive different test files from different ones of the operation systems 340 for the same API endpoint. The different test files may have different test structures, authentication credentials/tokens, and/or repeat data.

In some embodiments, the test system 320 may monitor the API endpoints indicated in the test files from the operation systems 340. While monitoring the API endpoints, the test system 320 may save the responses resulting from test structures from each test file. The responses may be associated with their corresponding test structures such that further response from test structures are compared to the corresponding stored responses.

In some embodiments, the test system 320 may provide a status of the API endpoints relevant to the operation systems 340. For example, the test system 320 may provide a status of an API endpoint to the operation systems 340 that provided a test structure for the API endpoint.

Alternately or additionally, the test system 320 may provide a status of all API endpoints relevant to the individual operation systems 340 regardless of whether the test system 320 received a test file for all of the API endpoints relevant to the individual operation systems 340. Alternately or additionally, the test system 320 may provide a status with respect to HTTP errors for all API endpoints relevant to the individual operation systems 340 regardless of whether the test system 320 received a test file for all of the API endpoints relevant to the individual operation systems 340. In these and other embodiments, the test system 320 may not provide a status with respect to operational errors for all API endpoints relevant to the individual operation systems 340 regardless of whether the test system 320 received a test file for all of the API endpoints relevant to the individual operation systems 340.

Modifications, additions, or omissions may be made to the system 300 without departing from the scope of the present disclosure. For example, in some embodiments, the system 300 may include a device, analogous to the device 140 of FIG. 1. In these and other embodiments, the device may be configured to provide test files to the test system 320 and/or receive API endpoints status from the test system 320 for one or more of the operation systems 340.

Figure 4:
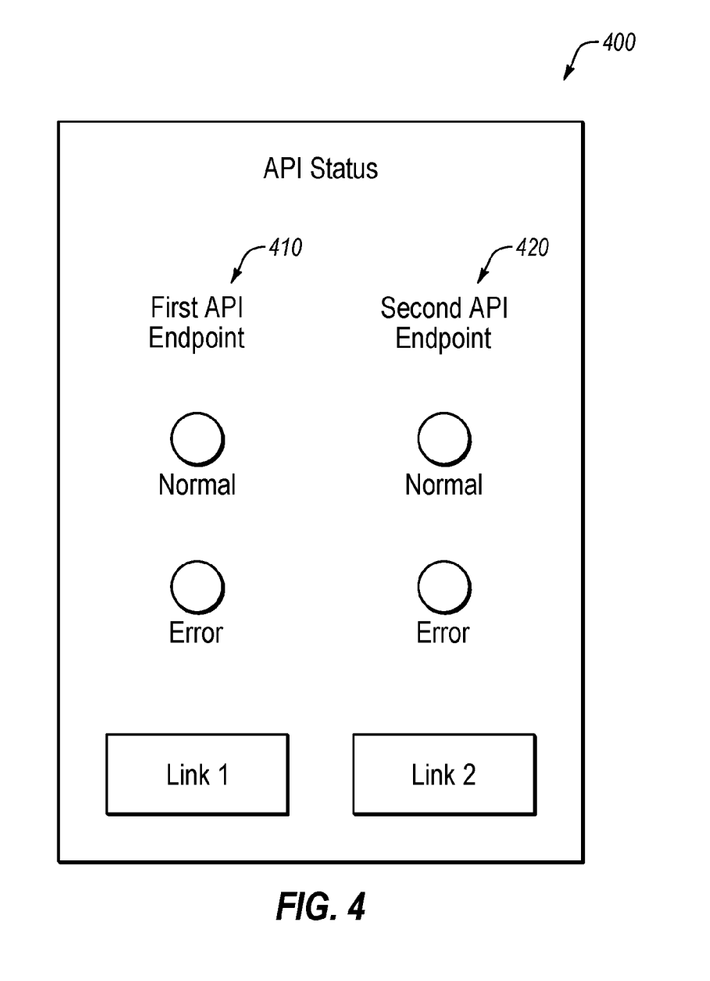
FIG. 4 illustrates an example user interface for a system configured to monitor API endpoints.

FIG. 4 illustrates an example user interface 400 for a system configured to monitor API endpoints. The user interface 400 may be arranged in accordance with at least one embodiment described in the present disclosure.

The user interface 400 may be configured to present a status about API endpoints monitored by a test system, such as the test system 120 and/or 320 of FIGS. 1 and 3. For example, the user interface 400 may be an example of a user interface that may be presented on the display 142 of the device 140 of FIG. 1.

The user interface 400 may provide a status of individual API endpoints. For example, the user interface 400 illustrates an embodiment where the status of a first API endpoint 410 and a second API endpoint 420 are being presented. In some embodiments, the user interface 400 may be configurable by the user. For example, the user interface 400 may additionally provide a user with an ability to select the API endpoints for which a status may be displayed.

As illustrated, for the first API endpoint 410, the user interface 400 may present a title of the API endpoint and an indication of whether the status of the first API endpoint 410 is normal or error. Furthermore, with respect to the first API endpoint 410, the user interface 400 may provide a link. The link may provide a user access to additional information about the first API endpoint 410, such as additional information about errors if the status of the first API endpoint 410 is error. Alternately or additionally, the link may provide a user access to adjust the test file of the first API endpoint 410. For example, the user may adjust the repeat data, authentication credentials, or other information in the test file. As another example, the user may review and approve a response that was different than a saved response to be used as a saved response. In some embodiments, instead of the link, the first API endpoint 410 may include the information from the link in the user interface 400. In some embodiments, the second API endpoint 420 may include elements similar or different than the first API endpoint 410.

In some embodiments, the user interface 400 may provide a user with the ability to update the status of the first API endpoint 410 and the second API endpoint 420 individually or collectively. For example, the user interface 400 may include a button that may be selected by a user. After selection of the button, a call may be made to each of the first API endpoint 410 and the second API endpoint 420 to update the status of the first API endpoint 410 and the second API endpoint 420. The call may be independent of a call that is made based on repeat data in test files for each of the first API endpoint 410 and the second API endpoint 420. In some embodiments, each of the first API endpoint 410 and the second API endpoint 420 may include a button associated therewith to update the status of the individual API endpoints.

Modifications, additions, or omissions may be made to the user interface 400 without departing from the scope of the present disclosure. For example, in some embodiments, the user interface 400 may present the status of more or less than the two API endpoints illustrated.

Figure 5A:
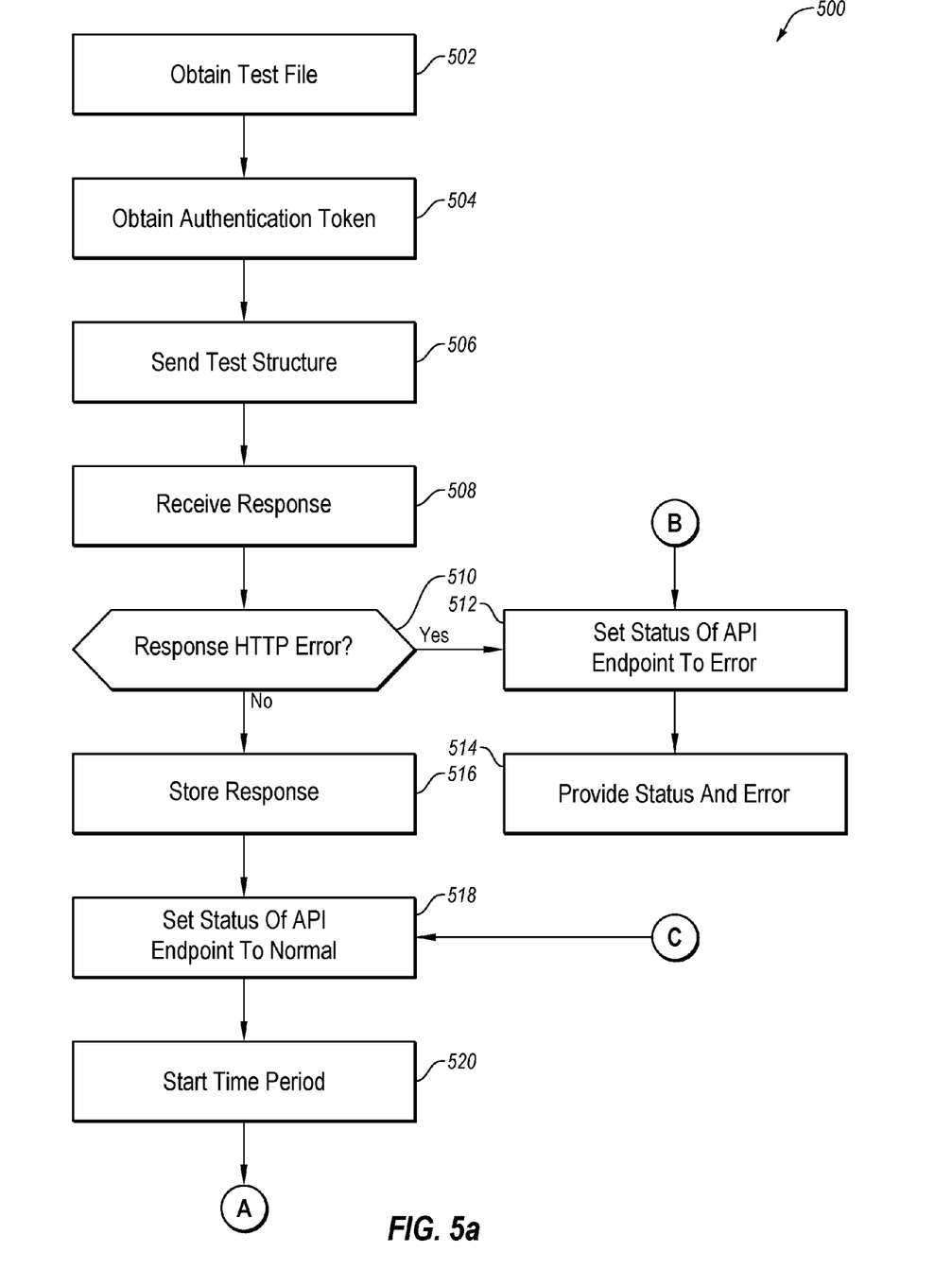
FIGS. 5a-5c illustrate a flowchart of an example computer-implemented method to monitor API endpoints.
Figure 5B:
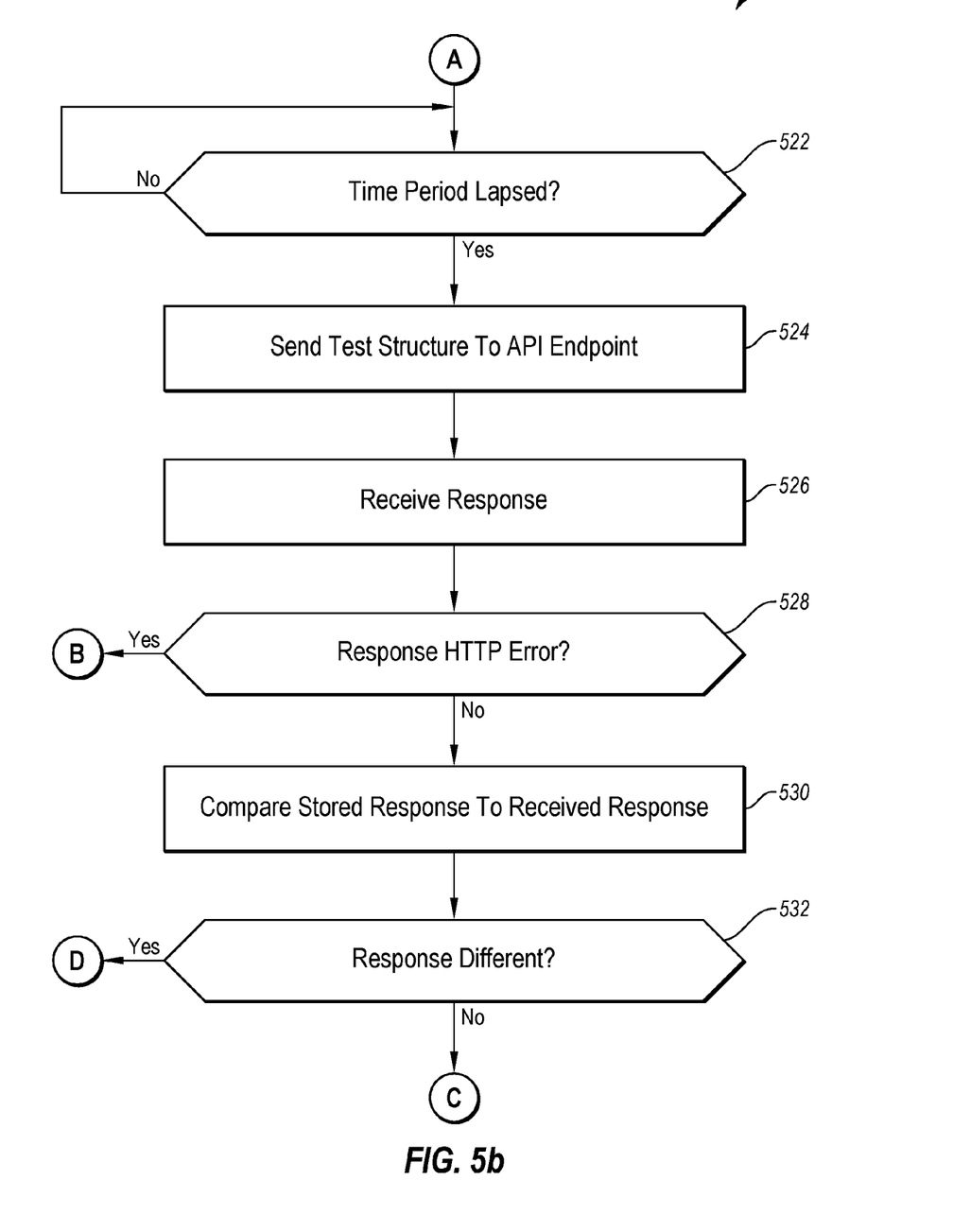
Figure 5C:
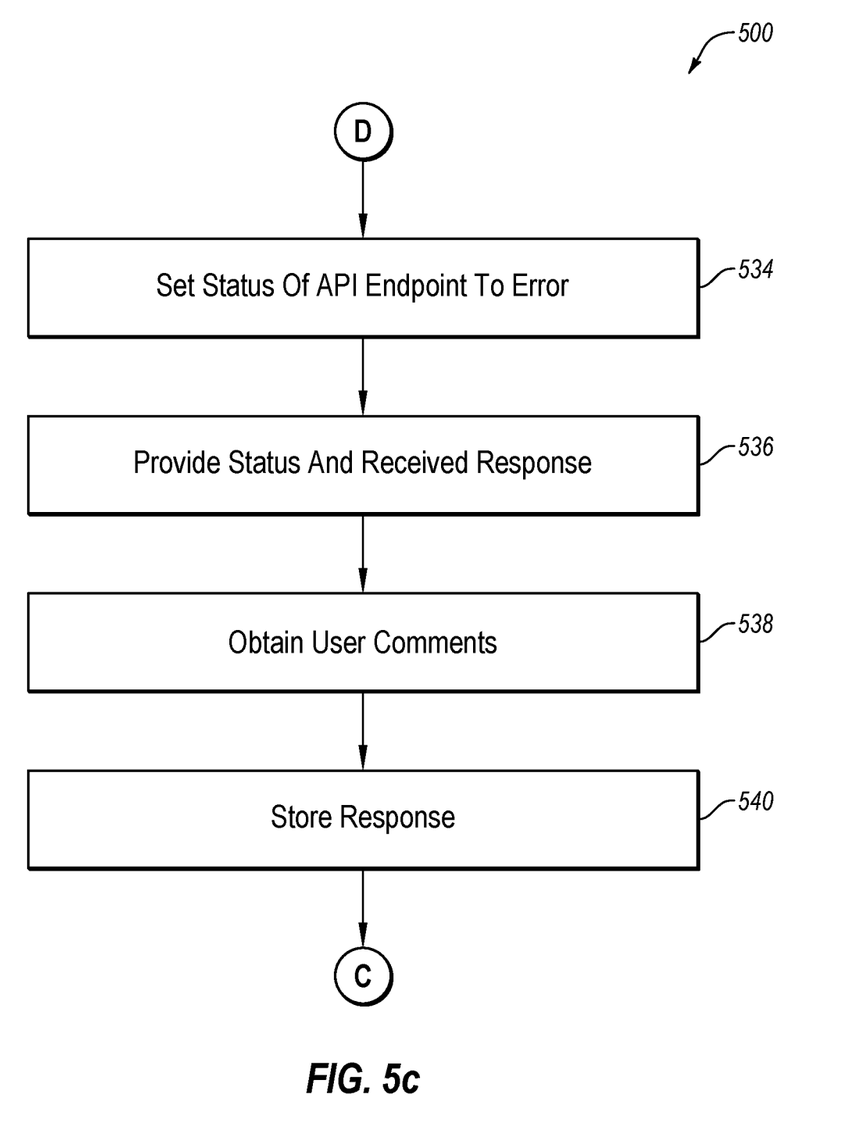

FIGS. 5a-5c is a flowchart of an example computer-implemented method 500 to obtain VoIP credentials for a device. The method 500 may be arranged in accordance with at least one embodiment described in the present disclosure. The method 500 may be implemented, in some embodiments, by a system, such as the system 100 and/or the system 300 of FIGS. 1 and 3, respectively. In some embodiments, the method 500 may result from operations performed by a system based on instructions stored in one or more computer-readable media. Although illustrated as discrete blocks, various blocks may be divided into additional blocks, combined into fewer blocks, or eliminated, depending on the desired implementation.

The method 500 may begin at block 502, where a test file may be obtained. The test file may be constructed based on an API endpoint that may be monitored. The test file may include one or more test structures, repeat data, an API endpoint address, and/or authentication credentials, among other data items. In some embodiments, the test structure being be configured on the structure of the API endpoint configured to be monitored. In some embodiments, the test file may be received from another device or generated by a test system.

In block 504, an authentication token may be obtained. The authentication token may be obtained by sending one or more test structures to the API endpoint with authentication credentials. In response to the authentication credentials, the API endpoint may respond with the authentication token.

In block 506, the test structure may be sent to the API endpoint. In some embodiments, the test structure may be different than the test structure sent to obtain the authentication token. In some embodiments, the test structure may be sent with the authentication token received in block 504.

In block 508, a response may be received. In block 510, it may be determined if the response is an HTTP error code. When the response is an HTTP error code, the method 500 may proceed to block 512. When the response is not an HTTP error code, the method 500 may proceed to block 514.

In block 512, a status of the API endpoint may be set to error. In block 514, the status of the API endpoint and the HTTP error code may be provide for presentation on a user interface. In some embodiments, the status of the API endpoint and the HTTP error code may be send across a network to another device for presentation.

In block 516, a response may be stored. The response that may be stored may be a non-HTTP code response from the API endpoint. The response that may be stored may be a response from the API endpoint in response to the data provided in the test structure to the API endpoint in block 506.

In block 518, a status of the API endpoint may be set to normal. In some embodiments, the status of the API endpoint as normal may be provided for presentation on a user interface.

In block 520, a time period may be started. In some embodiments, the time period may be selected based on repeat data in the test file obtained in block 502.

In block 522, it may be determined if the time period has lapsed. When the time period has not lapsed, the method 500 may proceed back to block 522. When the time period has lapsed, the method 500 may proceed to block 524.

In block 524, the test structure may be sent again to the API endpoint. The test structure sent to the API endpoint may be the same test structure sent to the API endpoint in block 506.

In block 526, a response may be received. In block 528, it may be determined if the response is an HTTP error code. When the response is an HTTP error code, the method 500 may proceed to block 512. When the response is not an HTTP error code, the method 500 may proceed to block 530.

In block 530, a response that is received that is a non-HTTP code response from the API endpoint may be compared to the stored non-HTTP code response. The response that is received that is a non-HTTP code response that is compared may be in response to the data provided in the test structure to the API endpoint in block 524.

In block 532, it may be determined if the received response and the stored response are different. When the received response and the stored response are not different, the method 500 may proceed to block 518. When the received response and the stored response are different, the method 500 may proceed to block 534.

In block 534, a status of the API endpoint may be set to error. In block 536, the status of the API endpoint and the received response may be provide for presentation on a user interface. In some embodiments, the status of the API endpoint and the received response may be sent across a network to another device for presentation.

In block 538, user comments regarding the received response that resulted in the status of the API endpoint being error may be obtained.

In block 540, the received response that resulted in the status of the API endpoint being an error after user confirmation may be stored. As a result, future received responses may be compared to this received response in block 530. The method 500 may continue at block 518.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may not include block 504 when the API endpoint is not a secure endpoint. Alternately or additionally, the method 500 may not include blocks 516, 524, 526, 536, 538, or 540. In these and other embodiments, the received response may be compared to a stored response that is received with the test file instead of from the API endpoint.

Figure 6:
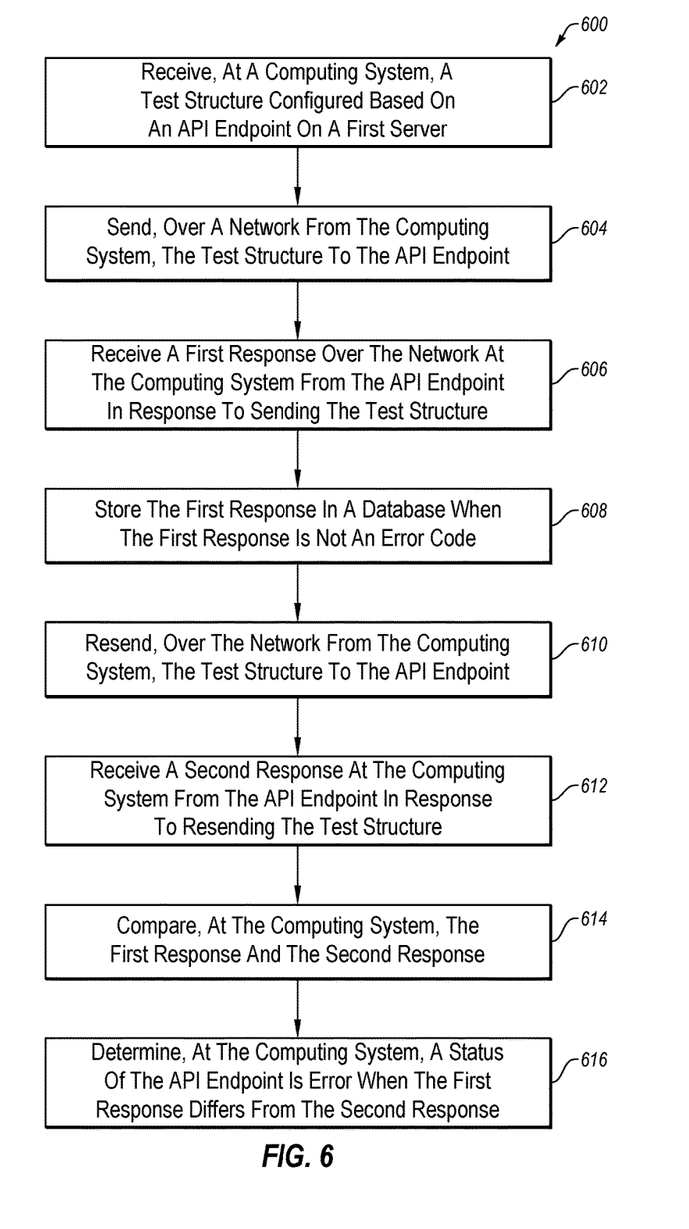
FIG. 6 is a flowchart of another example computer-implemented method to monitor API endpoints.

FIG. 6 is a flowchart of another example computer-implemented method 600 to monitor API endpoints. The method 600 may be arranged in accordance with at least one embodiment described in the present disclosure. The method 600 may be performed, in some embodiments, by a system, such as the system 100 and/or system 300 of FIGS. 1 and 3, respectively. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a test structure configured based on an API endpoint on a first server may be received at a computing system. In some embodiments, the test structure may include an authentication token previously provided by the API endpoint. The authentication token may have been provided by the API endpoint in response to the API endpoint receiving authentication credentials.

In some embodiments, the test structure may be part of a test file received at the computing system. In these and other embodiments, the test file may further include a network address of the API endpoint and configuration data. In these and other embodiments, the configuration data may include one or more of authentication credentials and repeat data.

In block 604, the test structure may be sent over a network from the computing system to the API endpoint.

In block 606, a first response may be received over the network at the computing system. The first response may be received from the API endpoint in response to sending the test structure.

In block 608, the first response may be stored in a database when the first response is not an error code. In particular, the first response may be stored when the first response is not an HTTP code response. In some embodiments, the error code may be an HTTP error code.

In block 610, the test structure may be resent over a network from the computing system to the API endpoint.

In block 612, a second response may be received at the computing system from the API endpoint in response to resending the test structure.

In block 614, the first response and the second response may be compared.

In block 616, a status of the API endpoint may be determined to be error when the first response differs from the second response.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include automatically generating a workflow when the status of the API endpoint is error.

Alternately or additionally, the method 600 may further include storing the second response in the database and resending, over the network from the computing system, the test structure to the API endpoint. In these and other embodiments, the second response may be stored in the database in response to receiving an indication that the second response indicates a non-error status of the API endpoint.

In some embodiments, the method 600 may further include receiving a third response from the API endpoint and comparing, at the computing system, the third response and the second response. In these and other embodiments, the method 600 may further include determining, at the computing system, the API endpoint has a status of error when the third response differs from the second response.

In some embodiments, when the test file includes repeat data, the method 600 may further include repeating steps of the method 600 at a frequency determined by the repeat data. In these and other embodiments, the steps that are repeated may include sending the test structure to the API endpoint and receiving a third response from the API endpoint. The steps may further include when the first response is not an error code or a HTTP code, comparing the third response to the first response and determining the status of the API endpoint is error when the third response differs from the first response.

Figure 7:
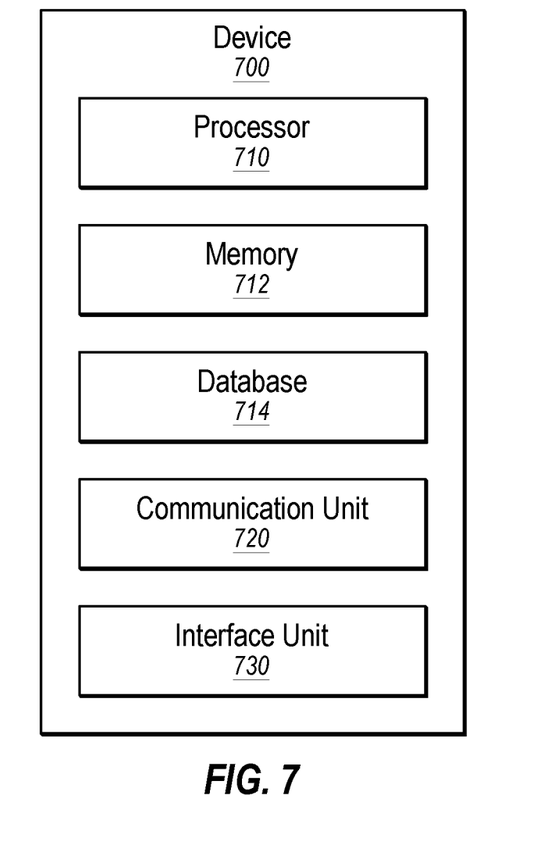
FIG. 7 illustrates an example computing system that may be used in a system configured to monitor API endpoints.

FIG. 7 illustrates an example computing system that may be used in a system configured to monitor API endpoints. The system 700 may be arranged in accordance with at least one embodiment described in the present disclosure. The system 700 may include a processor 710, a memory 712, a database 714, a communication unit 720, and a user interface unit 730, which all may be communicatively coupled. In some embodiments, the system 700 may be part of any of the system or devices described in this disclosure. For example, the system 700 may be part of the test system 120, the API server 130, and/or the device 140 of FIG. 1.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described herein. In some embodiments, the processor 710 may interpret and/or execute program instructions and/or process data stored in the memory 712, the database 714, or the memory 712 and the database 714. In some embodiments, the processor 710 may fetch program instructions from the database 714 and load the program instructions into the memory 712.

After the program instructions are loaded into the memory 712, the processor 710 may execute the program instructions. For example, the system 700 may be part of the test system 120 of FIG. 1. In these and other embodiments, the instructions may include the processor 710 instructing the communication unit 720 to send a test structure to an API endpoint.

As another example, the system 700 may be part of the device 140 of FIG. 1. For example, in these and other embodiments, the instructions may include the processor 710 receiving user input from the interface unit 730 regarding information for a test structure to send to a test system.

The memory 712 and the database 714 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations, such as one or more blocks of the method 500 or one or more blocks of the method 600.

The communication unit 720 may include any component, device, system, or combination thereof that is configured to transmit or receive information over a network. In some embodiments, the communication unit 720 may communicate with other devices at other locations, the same location, or even other components within the same system. For example, the communication unit 720 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 720 may permit data to be exchanged with a network and/or any other devices or systems described in the present disclosure. For example, if the communication unit 720 is included in the test system 120 of FIG. 1, the communication unit 720 may be configured to communicate with the API server 130 and/or device 140 over the network 110 of FIG. 1.

The user interface unit 730 may include any device to allow user to interface with the system 700. For example, the user interface unit 730 may include a mouse, a track pad, a keyboard, a touchscreen, among other devices. The user interface unit 730 may receive input from a user and provide the input to the processor 710. Modifications, additions, or omissions may be made to the system 700 without departing from the scope of the present disclosure.

As indicated above, the embodiments described herein may include the use of a special purpose or general purpose computer (e.g., the processor 710 of FIG. 7) including various computer hardware or software modules, as discussed in greater detail below. Further, as indicated above, embodiments described herein may be implemented using computer-readable media (e.g., the memory 712 or database 714 of FIG. 7) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order. Generally, the terms "first," "second," "third," etc., are used to distinguish between different elements as generic identifiers. Absence a showing that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to monitor application program interface (API) endpoints, the method comprising:
    receiving, at a computing system, a data structure configured based on a first API endpoint on a first server;
    sending, over a network from the computing system, the data structure to the first API endpoint;
    receiving a first response over the network at the computing system from the first API endpoint in response to sending the data structure;
    storing the first response in a database when the first response is not an error code;
    after storing the first response in the database, determining a status of a second API endpoint based on monitoring of the second API endpoint, wherein the second API endpoint is different from the first API endpoint;
    in response to the status of the second API endpoint meeting a first condition, resending, over the network from the computing system, the data structure to the first API endpoint;
    receiving a second response at the computing system from the first API endpoint in response to resending the data structure;
    comparing, at the computing system, the first response and the second response; and
    determining, at the computing system, a status of the first API endpoint is error when the first response differs from the second response.

2. The method of claim 1, wherein the error code is an hypertext transfer protocol (HTTP) error code.

3. The method of claim 1, wherein the data structure includes an authentication token previously provided by the first API endpoint, the authentication token provided by the first API endpoint in response to the first API endpoint receiving authentication credentials.

4. The method of claim 1, further comprising automatically generating a workflow when the status of the first API endpoint is error.

5. The method of claim 1, further comprising:
    storing the second response in the database;
    resending, over the network from the computing system, the data structure to the first API endpoint;
    receiving a third response from the first API endpoint;
    comparing, at the computing system, the third response and the second response; and
    determining, at the computing system, the first API endpoint has a status of error when the third response differs from the second response.

6. The method of claim 5, wherein the second response is stored in the database in response to receiving an indication that the second response indicates an non-error status of the first API endpoint.

7. The method of claim 1, wherein the data structure is part of a data file received at the computing system, wherein the data file further includes a network address of the first API endpoint and configuration data.

8. The method of claim 7, wherein the configuration data includes one or more of: authentication credentials and repeat data.

9. The method of claim 8, further comprising: repeating steps at a frequency determined by the repeat data, the steps including:
    sending the data structure to the first API endpoint;
    receiving a third response from the first API endpoint;
    when the first response is not an error code, comparing the third response to the first response; and
    determining the status of the first API endpoint is error when the third response differs from the first response.

10. At least one non-transitory computer readable media configured to store one or more instructions that when executed by the computing system cause the computing system to perform the method of claim 1.

11. A system configured to determine a status of application program interface (API) endpoints, the system comprising:
    a database configured to store a data structure configured based on a first API endpoint and a first response received from the first API endpoint in response to the first API endpoint receiving the data structure;
    a communication unit configured to send the data structure to the first API endpoint to receive the first response, and to receive a second response from the first API endpoint, the second response received in response to the first API endpoint receiving the data structure; and
    a processor configured to:
        after the first response is stored in the database, obtain a status of a second API endpoint based on monitoring of the second API endpoint, wherein the second API endpoint is different from the first API endpoint, in response to the status of the second API endpoint meeting a first condition and after receiving the first response when the first response is not an error code, direct the communication unit to send the data structure to the first API endpoint, compare the first response and the second response, and determine a status of the first API endpoint based on the comparison of the first response and the second response.

12. The system of claim 11, wherein the database further comprises a plurality of different data structures that include the data structure, wherein each of the plurality of different data structures corresponds to a different computing environment that communicates with the first API endpoint, wherein the processor is configured to determine the status of the first API endpoint with respect to each of the computing environments.

13. The system of claim 11, wherein the database further comprises a plurality of different data structures that includes the data structure and a plurality of different first responses that include the first response, wherein each of the plurality of different data structures corresponds to a different one of a plurality of API endpoints that include the first API endpoint and each of the plurality of different first responses corresponds to a different one of the plurality of API endpoints.

14. The system of claim 13, wherein:

the communication unit is further configured to receive a plurality of second responses that include the second response, each of the plurality of second responses received from one of the plurality of API endpoints, and the processor is further configured to determine the status of each of the plurality of API endpoints based on comparisons of first responses of the plurality of different first responses and corresponding second responses of the plurality of second responses.

15. The system of claim 13, wherein the processor is further configured to receive configuration data and provide a notification of the status for each of the plurality of API endpoints based on the configuration data.

16. The system of claim 15, wherein the processor is further configured to provide the notification of the status for each of the plurality of API endpoints for presentation on a single display.

17. A computer-implemented method to monitor application program interface (API) endpoints, the method comprising:

sending, over a network from a computing system, a test structure to a first API endpoint, the test structure configured based on the first API endpoint;

receiving a first response over the network at the computing system from the first API endpoint in response to sending the test structure;

after receiving the first response, determining a status of a second API endpoint based on monitoring of the second API endpoint, wherein the second API endpoint is different from the first API endpoint;

in response to the status of the second API endpoint meeting a first condition, resending, over the network from the computing system, the test structure to the first API endpoint;

receiving a second response at the computing system from the first API endpoint in response to resending the test structure;

comparing, at the computing system, the first response and the second response; and determining, at the computing system, a status of the first API endpoint based on the comparison of the first response and the second response.

18. The method of claim 17, further comprising:

resending, over the network from the computing system, the test structure to the first API endpoint;

receiving a third response from the first API endpoint;

comparing, at the computing system, the third response and the second response; and determining, at the computing system, the first API endpoint has a status of error when the third response differs from the second response.

19. The method of claim 17, further comprising:

repeating steps at a frequency determined by repeat data received at the computing system, the steps including:

sending the test structure to the first API endpoint;

receiving a third response from the first API endpoint;

when the first response is not an error code, comparing the third response to the first response; and determining the status of the first API endpoint is error when the third response differs from the first response.

20. At least one non-transitory computer readable media configured to store one or more instructions that when executed by the computing system cause the computing system to perform the method of claim 17.

* * * * *